Oct. 24, 1933.  E. CULVER ET AL  1,932,100
LENS
Filed May 1, 1929
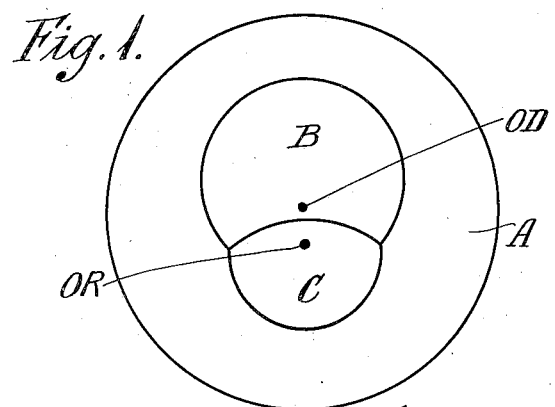
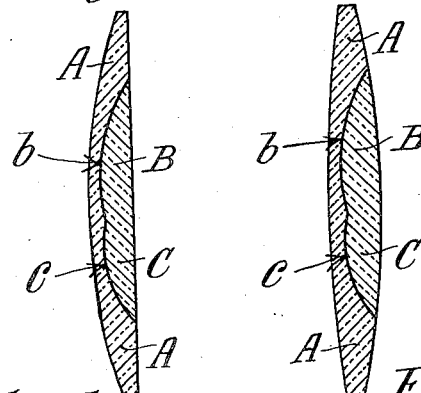
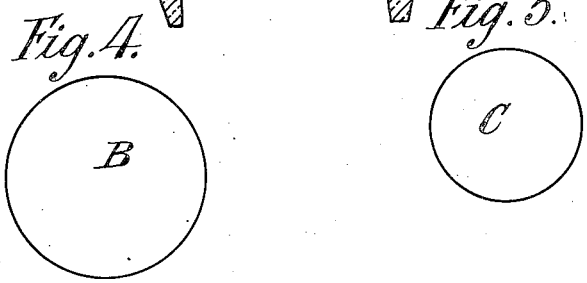
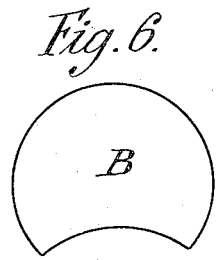
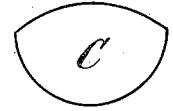
Inventors
EDWARD CULVER,
ALFRED HENRY EMERSON,
Attorneys Patented Oct. 24, 1933

1,932,100

UNITED STATES PATENT OFFICE 1,932,100

LENS

Edward Culver, London, and Alfred Henry Emerson, Finchley, London, England, assignors to United Kingdom Optical Company, Limited, London, England Application May 1, 1929, Serial No. 359,470, and in Great Britain January 11, 1929

11 Claims. (Cl. 88—54)

This invention relates to improvements in lenses and more particularly fused bifocal lenses.

It is well known that after the operation for cataract has been performed on an eye previously of normal or nearly normal vision, a very strong positive lens is needed in front of the eye to make up for the crystalline lens which has been removed, also that in removing the lens from the eye the ability to accommodate or focus for different distances of object has also been taken away, so that the single lens which might provide for vision at a distance will not enable near objects to be seen clearly. It is also well known that the field of view with strong and heavy positive lenses, even of the best form, is very limited, clear vision only being possible at or near the optical centre of the lens. A very small lens would therefore be quite as effective as the usual size worn, although it would not be elegant.

The main object of this invention is to provide a new strong convex or cataract fused bifocal lens devised to give a relatively large field of view as well as separate powers for distance and near vision.

According to the present invention the lens comprises a lenticular support in which are mounted, preferably by fusion, two or more adjacent lenses for vision and having varying focal length and whose optical centres are located normally in a line passing through the centre line of the support.

In this invention therefore the effective parts of the lens are carried in a lenticular support or a carrier of which the outer or marginal portions are of another power not used for vision but which act as a support or carrier for the portions used, and in combination provide the powers required.

A bifocal lens may be constructed by fusing into the lenticular support two overlapping segments or inserts, which combine with the major lens to serve as the distance and reading portions of the complete lens and are of higher refractive glass with very strong depression curves proportioned, as required so as to give good definition right up to the margin of the lens inserts. By forming the upper insert of a larger size and such that it overlaps the lower insert, a comparatively wide angle of clear vision can be obtained for distance with a correspondingly small but sufficient field of vision for reading or close work.

The present invention allows for very exact positioning of the optical centres of each field so that much more convenient and perfect vision is possible in a lens light in weight and suitable for the ordinary mounts or frames now worn.

The invention is illustrated in the accompanying drawing in which Figure 1 is an elevation of a circular lens constructed in accordance with the invention.

Figures 2 and 3 are corresponding vertical sections showing respectively a plano-convex and double convex lens.

Figures 4 and 5 are detail views of the inserts before insertion and fusion into the lenticular support.

Figures 6 and 7 are similar views of the inserts on completion of the lens.

Referring to the drawing A is the lenticular support or carrier which in the present invention forms a carrier for segmental inserts B and C. The upper portion B is used for distance vision and the lower portion C for reading.

The two segments or inserts B, C are of high and necessarily of the same refractive index and fused into the carrier A, which is also lenticular but not however employed for vision at its outer portion.

OD and OR indicate suitable positions for the optical centres of distance and reading fields that can be obtained.

Reference to Figures 2 and 3 will show the deep depression or contact curves indicated by arrows $b$ and $c$ which enable large powers to be added to that of the lenticular support A the power of which may be a little more than half of the total power. The difference in the powers for distance and reading is obtained by making the depression curve deeper, or of shorter radius, at $c$ than at $b$.

Figures 6 and 7 show respectively the shape of the segmental inserts B and C after fusion and working.

The distance vision field may be shaped as an incomplete circle as obtained by a larger circle cutting a smaller one with the geometrical centre of the smaller circle being outside the larger circle.

The near or reading vision field may also be shaped as an incomplete circle as obtained by a larger circle cutting a smaller one, the centre of the smaller circle being inside the larger circle.

The fields of vision are constructed with inserts of these shapes with the double purpose of giving the maximum field of vision and obtaining the optical centre of each portion in the most desired positions, with the further advantage that such lenses are relatively light in weight compared with their powers.

It should be understood that although as illustrated, the complete lens is of circular form it may be of any other suitable shape.

What we claim is:—

1. A bifocal lens comprising a lenticular support in which are mounted, such as by fusion, two inserts of different focal power, said inserts having a greater refractive index than that of the support with which they combine to form respectively the distance and close fields of vision of the lens, the insert for distance vision being large enough to cover the useful field of vision and overlapping the other insert for near vision which is smaller than and located below the other insert.

2. A fused bifocal lens as claimed in claim 1, in which the distance vision field is shaped as an incomplete circle as obtained by a larger circle cutting a smaller circle, the geometrical center of the smaller circle lying outside the larger circle, said centers of the near and distance vision inserts being located adjacent the center of the support.

3. A fused bifocal lens as claimed in claim 1, in which the near vision field is shaped as an incomplete circle as obtained by a larger circle cutting a smaller one, the center of the smaller circle lying inside the larger circle, said centers of the near and distance vision inserts being located adjacent the center of the support.

4. In a fused bifocal lens, a lenticular support of one glass having two intersecting curved depressions of different radii and an insert in each depression fused to each other and to the support with which they combine to form the sole fields of vision of the lens the insert in the depression with the lesser radius projecting on a curved line into the insert in the depression with the greater radius, both inserts being removed from the periphery of the support and consisting of major segments of circles having their centers located within the respective segments.

5. A fused bifocal lens comprising a lenticular support in which are fused two adjacent inserts having a higher refractive index than the support, each insert varying in focal length to serve in combination with the support for distance and close fields of vision of the lens, the inserts being defined by two major segments of circles so that the close vision insert projects into the distance vision insert, the optical centers of the merged inserts being located in a plane passing through the vertical meridian of the support.

6. A fused bifocal lens comprising a lenticular support in which are fused two adjacent inserts having a higher refractive index than the support, each insert having strong depression curves and varying in focal power to serve in combination with the support for distance and close fields of vision of the lens, the inserts being defined by two major segments of circles having their centers located within the respective segments and the optical centers of the inserts passing through the vertical meridian of the support.

7. A fused bifocal lens comprising a lenticular support in which are fused two adjacent inserts having a higher refractive index than the support, each insert varying in focal length to serve in combination with the support for distance and close fields of vision of the lens, the inserts being defined by two segments of circles with the upper circle larger than the lower circle and the centers of the circles located within their respective segments.

8. A fused cataract bifocal lens comprising a lenticular support having two fused inserts with strong depression curves, a comparatively large insert for distance vision, and a comparatively small insert for near vision and located below the the large insert with which it overlaps.

9. A cataract bifocal lens comprising a marginal non-visual lenticular support and central multifocal visual portions of different refractive index therefrom inserted in one face thereof, said visual portions having an upper distance vision insert and a lower near vision insert of unequal size.

10. A cataract bifocal lens comprising a marginal non-visual lenticular support and central multifocal visual portions of different refractive index therefrom inserted in one face thereof, said visual portions having an upper distance vision insert and a lower near vision insert of unequal size, and a downwardly arched line of joinder therebetween.

11. A cataract bifocal lens comprising a marginal non-visual lenticular support and central multifocal visual portions of different refractive index therefrom inserted in one face thereof, said visual portions having an upper distance vision insert and a lower near vision insert of unequal size, said distance vision insert being larger than said near vision insert and separated from it by a downwardly arched line of joinder.

EDWARD CULVER.
ALFRED HENRY EMERSON.